United States Patent Office 3,671,347
Patented June 20, 1972

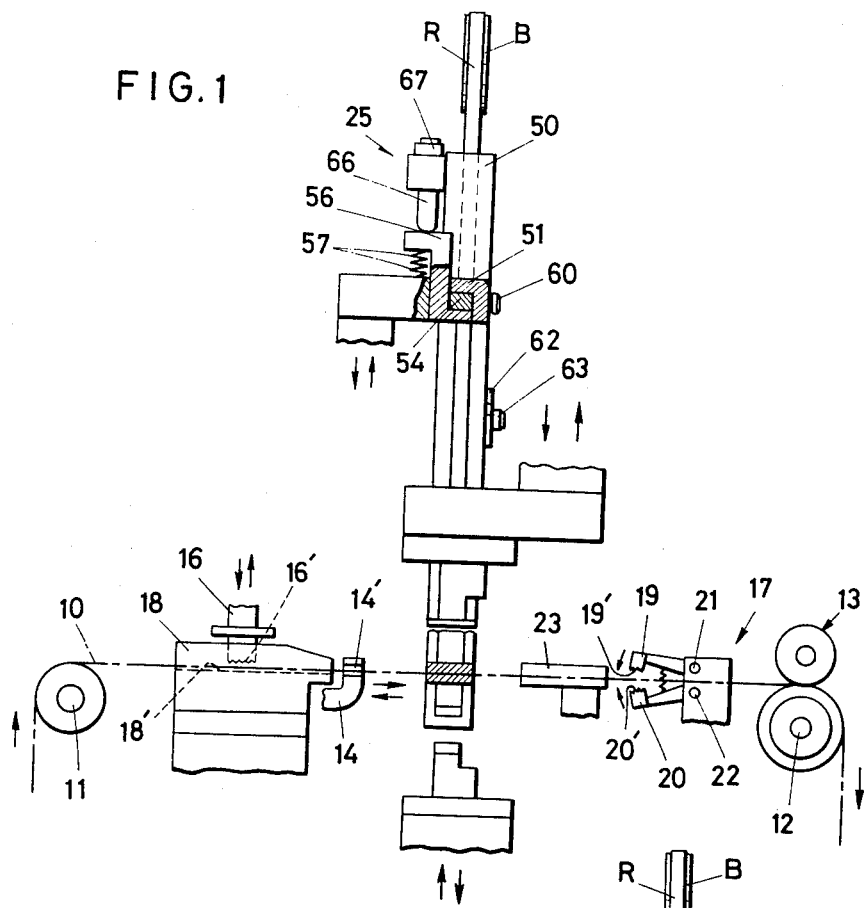
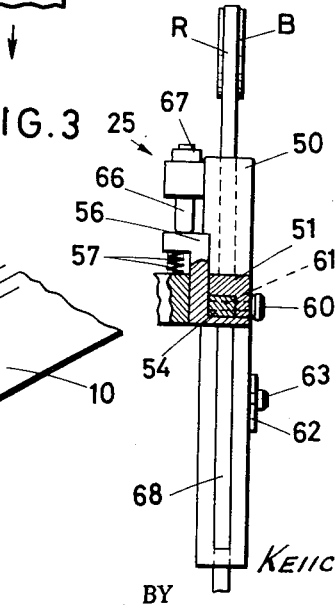
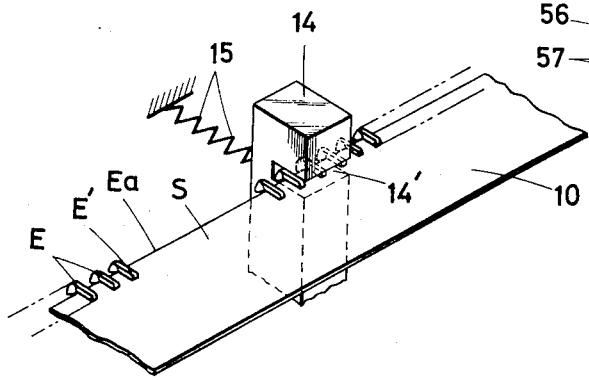

3,671,347
METHOD AND APPARATUS FOR ATTACHING A REINFORCING MATERIAL TO A SLIDE FASTENER CHAIN
Keiichi Yoshieda, Kurobe-shi, Japan, assignor to Yoshida Kogyo Kabushiki Kaisha, Tokyo, Japan
Filed Nov. 3, 1970, Ser. No. 86,416
Int. Cl. B32b 31/10; B65c 9/36
U.S. Cl. 156—160                                 8 Claims

ABSTRACT OF THE DISCLOSURE

Method and apparatus for attaching a reinforcing material to a slide fastener chain wherein the reinforcing material is secured in position on the slide fastener chain in a series of steps in a mechanical cycle comprising advancing a fastener chain in a horizontal path of travel to a predetermined point at which the mechanical cycle commences, holding a predetermined length of the chain taut in position, positioning a reinforcement strip substantially at right angles to the plane of the chain and moving the said strip transversely across the path of travel of the chain until it is folded in half on itself around one edge of the space section of the chain, and pressing the reinforcement strip adhesively into position on the said space section, the said mechanical cycle being coordinated with intermittent advancement of the fastener chain.

---

This invention relates to a method and apparatus for attaching a reinforcing strip onto a slide fastener chain and has particular reference to a method and means of securing a strip or tape of a reinforcing material such as for example a thermoplastic resin into position on a slide fastener chain of the type consisting of a pair of continuous length stringers each having alternate element-containing and element-free sections.

Complete slide fasteners or zippers made from fastener chains of the type described are known as a "separable fastener" having opposed stringer tapes separably joined by a pin member on the one stringer and a pin receiving box member on the other stringer. To provide such pin and box members on the fastener as desired, it is necessary to reinforce or strengthen the stringer tapes that are relatively soft and flexible. The portions of the stringer tapes to which the pin and box are secured, are normally devoid of fastener elements and usually termed as "space" portions in the art.

The conventional practice of attaching reinforcing strips to a fastener chain has been to move the chain laterally towards a precut reinforcing strip positioned vertically in the path of travel of the chain until the strip is folded in half on itself and to press the thus folded strip into position on the chain. Lateral movement of an infinitesimally long fastener chain with respect to a stationarily held reinforcement strip would literally involve complicated equipment mechanisms if automation was desired, and hence such operation has been mostly manual, which would in turn often result in irregularities of the finished product.

Therefore, it is the primary object of the present invention to provide a novel method and means of attaching reinforcing strips to a fastener chain which will eliminate the above-noted difficulties of the conventional practice.

It is a more specific object of the invention to provide a novel method for reinforcing a fastener chain with reasonable accuracy and without having to displace the chain away from its line of travel.

It is another specific object of the invention to provide a relatively simple apparatus for carrying the said method into practice in an automatic mode of operation. These and other objects and features of the invention will be apparent from the detailed description which will follow in connection with the accompanying drawings illustrating a preferred embodiment. In the drawings:

FIG. 1 is a front elevation of an apparatus embodying the invention;

FIG. 3 is a view showing a reinforcing strip supply mechanism forming one important aspect of the invention;

FIG. 4 is a perspective view showing relative position of a feeler pin and an element-carrying edge of the chain;

Figure 5A:
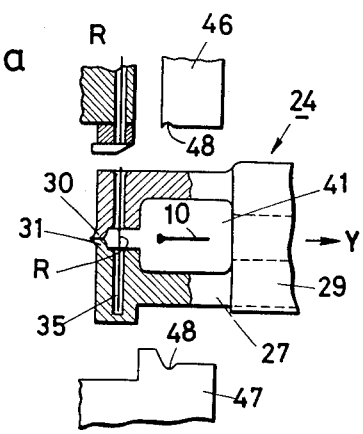
Figure 5B:
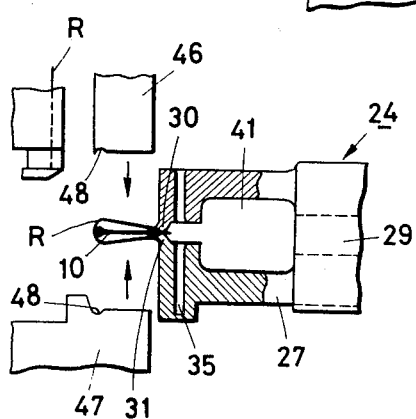
Figure 5C:
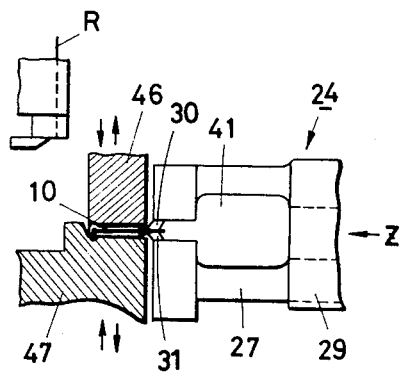
Figure 6:
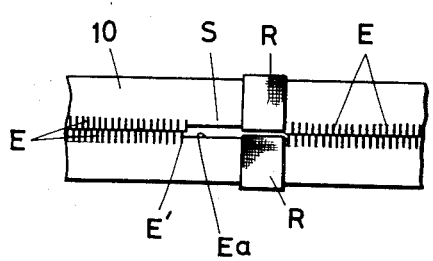

FIGS. 5a, 5b and 5c, inclusive, are schematic views utilized to explain the manner in which a reinforcing strip is positioned, folded and pressed onto a fastener chain according to the invention; and FIG. 6 is a plan view of the segment of a double-chain fastener which has been provided with a reinforcing strip on each stringer tape.

It is to be noted that like reference numerals refer to like parts throughout the various figures of the drawings.

The apparatus presently illustrated is designed for applying two reinforcement strips at a time onto a continuous fastener chain of the double-chain type consisting of a pair of stringer tapes each carrying thereon rows of interengageable fastening elements alternated at predetermined intervals with space sections or blank tape portions devoid of fastening elements. It is however obvious to apply the invention to a single-chain fastener with similar results.

Briefly stated, the principles underlining the method of the invention reside in the series of steps in a mechanical cycle which comprises: advancing a fastener chain in a horizontal path of travel to a predetermined point at which the mechanical cycle commences, holding a predetermined length of the chain taut in position; positioning a reinforcement strip substantially at right angles to the plane of the chain and moving the said strip transversely across the path of travel of the chain until it is folded in half on itself around one edge of the space section of the chain; and pressing the reinforcement strip adhesively into position on the said space section, the said mechanical cycle being coordinated with intermittent advancement of the fastener chain.

The foregoing method is carried into practice by the apparatus which will now be discussed in detail with reference to the drawings.

The apparatus according to the invention essentially comprises an advancing means for intermittently feeding a fastener chain unidirectionally in a horizontal path of travel; a stopping means engageable with one longitudinal edge of the fastener chain for stopping the latter at a predetermined point in the path thereof; a tension applying means for holding a predetermined length of the chain taut in position; a reinforcing strip holding and applying means reciprocable laterally towards and away from the path of the fastener chain tape 10 for holding a piece of strip in position for application to the fastener chain; a press means for pressing the strip adhesively into position on the chain; and a reinforcing strip supply means for supplying a reinforcing strip to the said holding and applying means.

The fastener chain which is conveniently referred to hereafter as tape 10 carries rows of interlocking elements E, and may be substantially endless or of any desired length. The tape 10 is moved unidirectionally, viz, from left to right as viewed in FIG. 1, by the advancing means including a suitable guide roller 11 and a feed roller 12 disposed so as to orient the tape 10 to move in a substantially horizontal path through the machine. The advancing means may be of any suitable type, and it is presently shown as comprising a pressure roller 13 engaged with the feed roller 12 to feed the tape 10 frictionally therebetween.

The stopping means comprises a feeler pin 14 which has a recess 14' disposed for engagement with the elements E and which is normally urged by a spring 15 towards an element-carrying edge Ea of the tape 10 as shown in FIG. 4. The feeler pin 14 is thus arranged in resiliently abutting relation to the element-carrying edge Ea in the path of travel of the tape 10. The feeler pin 14 functions to determine the length of tape 10 to be forwarded in each intermittent movement thereof. This is accomplished in the manner in which the pin 14 engages slidably with the row of elements E, disengages therefrom as the tape 10 moves progressively and then engages with the element-free beaded edge of the space portion S until it finally abuts against a leading element E' in the ensuing unit length of the tape 10. The impingement of the pin 14 upon the leading fastener element E' is utilized as a source of signal for stopping the longitudinal movement of the tape 10. After an interval of time during which the tape 10 is provided with a reinforcing strip R in a manner hereafter described, the feeler pin 14 is moved away from the element-free edge of the space portion S against tension in the spring 15 and ridden over the row of elements E to repeat its function.

With the tape 10 thus held in stopped position where its space portion S lies in the path of reciprocation of the strip holding means, a tension is imparted to the tape 10, particularly at the space portion S thereof, by the tension applying means comprising a clamper 16 and a gripper 17. The clamper 16 is vertically movable towards and away from the plane of the tape 10 and has a toothed or otherwise coarse end face 16' for engagement with a correspondingly shaped face 18' in a tape guide 18. The tape 10 is thus retained in position frictionally between the two abutting faces 16' and 18' as the clamper 16 is lowered. The gripper 17 located opposite to the clamper 16 has coacting gripping arms 19, 20 movable about their respective pivots 21, 22 towards and away from each other. Each gripping arm has a toothed abutting end face 19' or 20' for frictionally retaining the tape 10 in position. With the tape 10 thus retained in position by the gripping arms 19, 20, the gripper 17 is arranged to move slightly in the same direction as the tape 10 is fed, thereby imparting a tension to the section of the tape 10 that is positioned between the clamper 16 and the gripper 17. In this manner, the space portion S of the tape 10 is held in set position for receiving a reinforcing strip R. Designated at 23 is a tape guide provided adjacent to the gripper 17.

Figure 2:
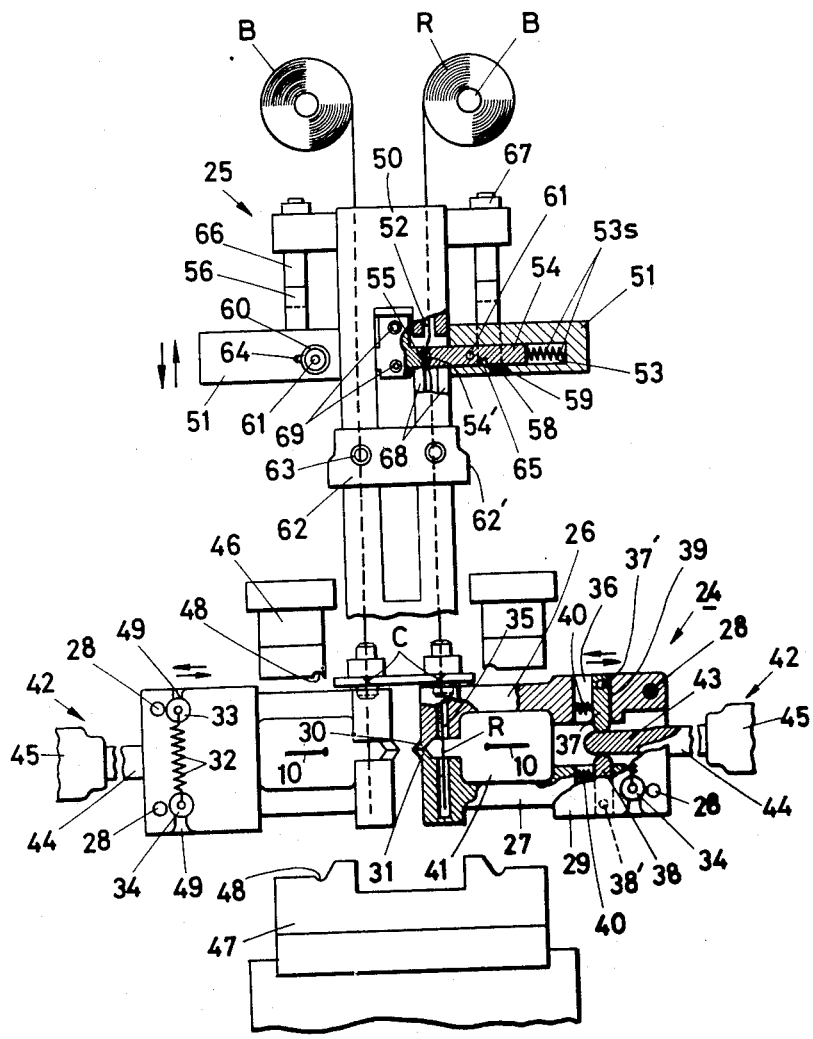
FIG. 2 is a detailed side elevation, partly sectional, of important parts of the apparatus of FIG. 1.

Referring now to FIG. 2 in particular, the reinforcing strip holding and applying means generally designated at 24 is shown below as operatively associated with the reinforcing strip supply means 25 above. The holding and applying means 24 comprises a pair of jaw members 26 and 27 each having one end pivotally connected by pin 28 to a side plate 29. The other ends of the jaws 26, 27 are tapered off to form opposed clipping lips 30, 31. These lips are normally closed under the influence of a spring 32 connecting between rolls 33 and 34 respectively secured to the upper and lower jaws 26 and 27 closely adjacent to the connecting pins 28. A vertical registering slit 35 is formed in the jaws close to the lips, 30, 31 and opens to communicate with the reinforcing strip supply means later described. The jaws are provided with recesses 36 near the position of the rolls 33 and 34 for accommodating opposed fingers 37, 38. These fingers are pivotally connected at one end as at 37', 38' to the respective jaws and normally urged into abutting relation to recessed walls 39 of the jaws by means of springs 40 disposed in the recesses 36. There is provided a tape guide channel 41 extending through the side plate 29 and jaws 26, 27 in alignment with the horizontal path of travel of the tape 10 and communicating with the vertical slit 35. A stationary cam member 42 is provided for engagement with the holding and applying means 24 as shown in FIG. 2. The cam member 42 has a first land 43, a second land 44 and a third land 45 that are progressively higher in that order.

As already stated, the reinforcing strip holding and applying means 24 is moved by a suitable drive (not shown) back and forth in a direction traversing the horizontal path of the tape 10. As the means 24 retracts or moves away from the path of the tape 10, viz in the direction of Y as indicated in FIG. 5a, the fingers 37, 38 slides along the first land 43 of the cam 42 and then rides over the second land 44 which is slightly higher than the first land 43 as seen in FIG. 2. When riding over the second land 44, the fingers 37, 38 being rotatable about the pins 37', 38', tend to tilt from their upright position (FIG. 2) against tension of the springs 40 and hence do not as yet allow the jaws 26, 27 to open and draw apart. During the travel of the fingers 37, 38 along the second land 44 of the cam 42, the reinforcing strip R depending in the slit 35 approaches and folds centrally in half on itself around the beaded edge of the space portion S. This takes place as a result of the taut space portion S intruding into and forcing the lips 30, 31 to open against tension in the spring 32. The holding and applying means 24 thus retracts until the lips 30, 31 close again under the influence of the spring 32 and pinch the folded edges of the strip R as shown in FIG. 5b. In this position, the reinforcing strip R is pressed adhesively into position on the space portion S by the press means comprising vertically movable coacting dies 46 and 47 each having a recess 48 configured to correspond with the configuration of a swollen beaded edge of the space portion S of the tape 10. FIG. 5c illustrates how the strip R is pressed and secured to the space portion S by the coating die members 46, 47.

With further retracting movement of the means 24, the third land 45 of the cam 42 is brought into engagement with the upper and lower rolls 33, 34 and force these rolls to move oppositely away from each other against tension of the spring 32 along a guide slot 49 formed in the side plate 29. This causes the mating jaws 26, 27 to move widely apart and the lips 30, 31 to open to release the strip R during which time the fingers 37, 38 disengage from the second land 44 and resume the initial upright position under the influence of their respective springs 40, 40.

Upon completion of the attaching of strip R to the tape 10, subsequent to releasing of the strip R from the clips 30, 31, the continuous fastener tape is advanced another set distance to be determined by the stopping means viz feeler pin 14, whereupon the next cycle of operation begins. With the tape 10 held in stopped position by the activation of the feeler pin 14, the clamper 16 and gripper 17 coordinate to apply a tension to the tape 10 to keep the same taut in set position for receiving a strip R. As soon as the tape 10 is thus set in position, as shown in FIG. 5c, the strip applying means 24 begins its forward movement in the direction of Z across the path of the tape 10 in which the fingers 37, 38 slide back along the second land 44 of the cam 42, allowing the space portion S to be threaded through the opening of the lips 30, 31. The forward movement of the means 24 continues until the fingers 37, 38 are released from the second land 44 and engage the first land 43, whereupon the clipping lips 30, 31 are closed together under the influence of the spring 32. The means 24 thus advances to a position in which, as shown in FIG. 2, the strip receiving slit 35 registers with a strip supply slit later described in connection with the supply means 25.

The supply means 25 for delivering a reinforcing strip R to the holding and applying means 24 is shown in FIGS. 1, 2 and 3. As better illustrated in FIG. 2, the supply means 25 comprises a guide pillar 50 carrying on each side an arm 51 capable of sliding up and down therealong. The guide pillar 50 is provided internally with a through-slit 52 extending vertically in registry with the slit 35 in the holding and applying means 24 situated below the supply means 25. The reinforcing strip R is reeled out from a bobbin B and threaded through the through-slit or supply channel 52 to reach the receiving slit 35. The slidable arm 51 has a longitudinally elongated recess 53 for accommodating a plunger 54 having a toothed or otherwise coarse end 54' and its other end connected to a spring 53s. The plunger 54 is thus normally urged into the path of the reinforcing strip R dependent from the bobbin B and holds the strip R in gripping relation to a mating toothed gripping member 55 secured by bolts 69 centrally to the arm 51. A locking member 56 is resiliently connected by means of a spring 57 to the arm 51 and has a claw 58 normally received in a recess 59 formed in the bottom of the arm 51. A cam roller 60 is fixedly connected by a support pin 61 to the plunger 54 adjacent to the toothed end 54'. A cam member 62 is supported on the guide pillar 50 by means of an adjusting nut 63 and adapted for abutting engagement with the cam roller 60 to limit the downward stroke of the arm 51.

By this construction, the reinforcing strip R is fed by descending movement of the arm 51 for a distance substantially equal to the length of the vertical receiving slit 35 and to a position wherein the cam roller 60 rides onto the cam face 62' of the cam 62. In this position, the roller 60 is allowed to move laterally against tension in the spring 53s, for which purpose there is provided a guide slot 64 in the arm 51 along which the pin 61 of the roller 60 is allowed to escape. Lateral displacement of the roller 60 releases the plunger 54 from the strip R and moves the plungers 54 away from the path of the strip R until the claw 58 of the locking member 56 is urged into a recess 65 in the plunger 54 under the influence of the spring 57, thereby retaining the plunger 54 in operative position. The arm 51 is then moved upwards back to its normal position (FIG. 2) wherein the locking member 56 abuts against a downwardly projecting stopper 66 limiting the upward stroke of the arm 51 and releases its claw 58 from the recess 65 against tension in the spring 57, whereupon the plunger 54 is urged by the spring 53s into the path of the strip and grips the latter with the mating gripping member 55. The cycle of feeding of the strip R is thus repeated.

Designated at C is a cutter disposed in alignment with the path of the strip R for shearing the latter to a desired length immediately above the vertical receiving slit 35. Designated at 67 is an adjusting nut for adjustably securing the stopper 66 in position. Designated at 68 is an elongated channel for guiding the toothed end portions of the plunger 54 and gripping member 55 that project into the path of the strip R during the upward and downward movements of the sliding arm 51.

The described operation and the apparatus to carry this operation into practice are simple and reliable. Yet, as compared to conventional manual operation, the speed of attaching reinforcing strip to a fastener chain is increased manifold.

While a specific embodiment of the invention has been shown and described to illustrate the application of the invention, it will be understood that various changes and modifications may be made therein without departing from the scope of the appended claims.

What is claimed is:

1. Method of attaching a reinforcing material to a slide fastener chain having alternate element-containing and element-free sections which comprises: advancing a fastener chain intermittently in a horizontal path of travel; stopping the chain at a position wherein its element-free section is set for receiving a reinforcing strip; gripping a length of the chain including the element-free section and applying a tension thereto to keep the same taut in position; positioning a predetermined length of a reinforcing strip substantially at right angles to the plane of the chain and moving said strip transversely across the path of the chain until it is folded in half on itself around one edge of the element-free section of the chain; and pressing said strip adhesively into position on said element-free section.

2. An apparatus for attaching a reinforcing material to a slide fastener chain having alternate element-containing and element-free sections which comprises in combination: an advancing means for advancing a fastener chain intermittently in a horizontal path of travel to a predetermined point at which a mechanical cycle of operation of the following means commences; a stopping means resiliently engageable with an element-carrying edge of the chain for stopping the travel of the chain when in contact with the leading element thereof; a tension applying means for gripping a length of the chain including the element-free section and applying a tension thereto to keep the same taut in position; a holding means movable towards and away from the path of the chain for holding a predetermined length of a reinforcing strip substantially at right angles to the plane of the fastener chain and moving said strip transversely across the path of the chain until it is folded in half on itself around one edge of the element-free section of the chain; and a press means for pressing said strip adhesively into position on said element-free section.

3. An apparatus for attaching a reinforcing material to a slide fastener chain having alternate element-containing and element-free sections which comprises in combination: an advancing means for advancing a fastener chain intermittently in a horizontal path of travel to a predetermined point at which a mechanical cycle of operation of the following means commences; a stopping means resiliently engageable with an element-carrying edge of the chain for stopping the travel of the chain when in contact with the leading element thereof; a tension applying means for gripping a length of the chain including the element-free section and applying a tension thereto to keep the same taut in position; a holding means movable towards and away from the path of the chain for holding a predetermined length of a reinforcing strip substantially at right angles to the plane of the fastener chain and moving said strip transversely across the path of the chain until it is folded in half on itself around one edge of the element-free section of the chain, said holding means having a vertical slit for receiving said strip, a press means for pressing said strip adhesively into position on said element-free section; and a supply means for delivering said reinforcing strip to said holding means with its vertical slit positioned inwardly of the element-carrying edge of the chain.

4. The apparatus according to claim 2 wherein said stopping means comprises a feeler pin disposed in the path of the chain and resiliently held in abutting engagement with the element-carrying edge of the chain.

5. The apparatus according to claim 2 wherein said tension applying means comprises a clamper having a coarse end face for engagement with a correspondingly shaped face and a gripper cooperable with said clamper and having gripping arms rotatable towards and away from each other.

6. The apparatus according to claim 2 wherein said holding means comprises a plate member, a pair of jaw members reciprocable into and away from the path of the fastener chain and having one ends thereof pivotally connected to said plate member and the other ends tapered off to form opposed clipping lips, said jaws being provided with a vertical registering slit for receiving a reinforcing strip and holding said strip perpendicularly substantially at right angles to the plane of the fastener chain, spring-urged opposed fingers having one ends thereof pivotally connected to the respective jaws, a cam member having a first land, a second land and a third land progressively higher in that order and adapted for engagement with the other ends of said fingers, and spring-urged opposed rollers pivoted to the respective jaws and adapted for engagement with the third land of said cam to open the jaws apart, said jaws being further provided with a fastener chain guide channel extending in alignment with the path of the chain and communicating with said registering slit.

7. The apparatus according to claim 3 wherein said supply means comprises a guide pillar having a delivery slit registering with said vertical slit in said holding means and a guide channel communicating with said delivery slit, an arm movable reciprocally along said guide pillar, a plunger disposed in the interior of said arm and movable towards and away from the path of a reinforcing strip, a stationary gripping member secured to said arm and coacting with said plunger to grip the reinforcing strip, a first cam adjustably mounted on said guide pillar for limiting the downward stroke of said arm, a second cam secured to the upper part of said guide pillar for limiting the upward stroke of said arm and a cutter disposed closely above said vertical slit in said holding means and adapted to cut the reinforcing strip to a length substantially equal to the length of said vertical slit.

8. The apparatus according to claim 2 wherein said press means comprises vertically opposed coacting die members movable towards and away from each other.

References Cited
UNITED STATES PATENTS

| | | | |
|---|---|---|---|
| 2,577,674 | 12/1951 | Broughton | 156—216 X |
| 2,625,862 | 1/1953 | Bokenkroger | 156—216 X |
| 3,147,172 | 9/1964 | Wesa et al. | 156—216 X |
| 3,245,859 | 4/1966 | Busk | 156—479 |
| 3,461,020 | 8/1969 | Loveland et al. | 156—489 X |
| 3,535,189 | 10/1970 | Hall et al. | 156—479 X |
| 3,576,696 | 4/1971 | Normanton | 156—164 |

HAROLD ANSHER, Primary Examiner

U.S. Cl. X.R.

156—202, 204, 216, 227, 264, 479, 519

UNITED STATES PATENT OFFICE
CERTIFICATE OF CORRECTION

Patent No. 3,671,347          Dated 6-20-1972

Inventor(s) Yoshieda, Keiichi

It is certified that error appears in the above-identified patent and that said Letters Patent are hereby corrected as shown below:

In the title of the Patent, between the U.S. filing date and the International Class, insert: --Claims priority, application Japan, November 12, 1969.  90575/44, 90576/44 and 90577/44.--

Signed and sealed this 1st day of May 1973.

(SEAL)
Attest:

EDWARD M. FLETCHER, JR.          ROBERT GOTTSCHALK
Attesting Officer                Commissioner of Patents